Sept. 29, 1942.  C. W. BONDURANT  2,296,898

ADJUSTABLE THERMOSTATIC VALVE

Filed April 26, 1941

INVENTOR
CARLTON W. BONDURANT
BY
Hyde and Meyer
ATTORNEYS

Patented Sept. 29, 1942

2,296,898

UNITED STATES PATENT OFFICE 2,296,898

ADJUSTABLE THERMOSTATIC VALVE

Carlton W. Bondurant, Euclid, Ohio, assignor to The Titan Valve and Manufacturing Company, Cleveland, Ohio, a corporation of Ohio Application April 26, 1941, Serial No. 390,481

3 Claims. (Cl. 74—100)

This invention relates to thermostatically controlled snap acting mechanism and more particularly to improvements in apparatus for varying or controlling the sensitivity or differential of thermostatic snap acting mechanism.

One of the objects of the present invention includes the provision in a snap acting mechanism embodying an over-center spring, of an additional spring, preferably adjustable, for pushing the snap mechanism over center when it has reached what would normally be approximately a position of balance. It is possible by this improvement to cause the mechanism to snap over a center position of balance without the additional movement of the thermostat which would normally be necessary to move the mechanism from the position of balance. This improvement therefore makes the mechanism more sensitive to thermostatic action. In other words a device which might require 20° change of thermostat temperature to produce over-center movement of the snap mechanism may be rendered more sensitive so that perhaps 15° of temperature change will be sufficient to cause the over-center movement.

Figure 1:
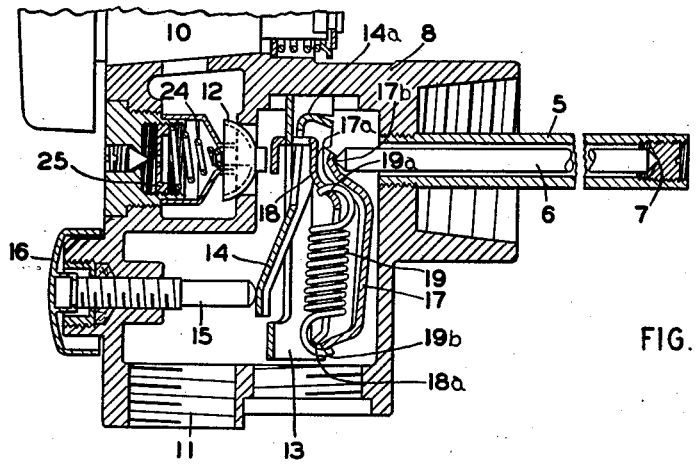
Figure 2:
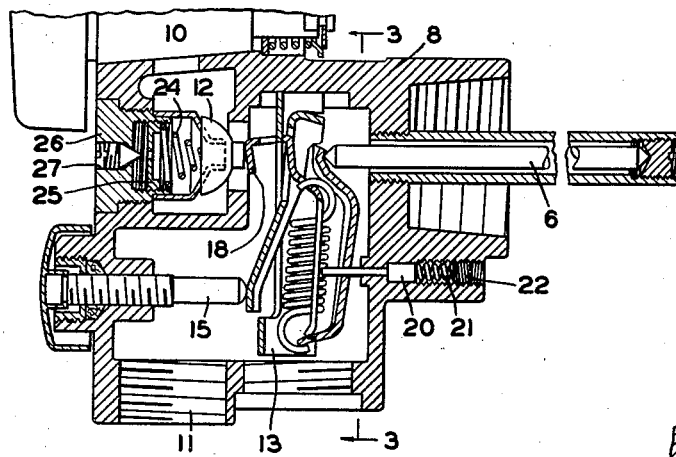
Figure 3:
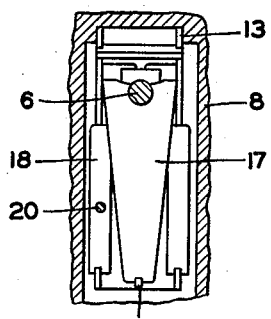

In the drawing, Fig. 1 is a central sectional view through a typical snap acting mechanism equipped with my improvement for moving the snap mechanism over center in one direction; Fig. 2 is a view similar to Fig. 1 but with separate devices for moving the snap mechanism over center in either of two directions; Fig. 3 is a fragmental sectional view taken along the line 3—3 of Fig. 2; while Fig. 4 is an enlarged diagrammatic view of a portion of the mechanism of Fig. 2 to illustrate the principle involved.

The specific snap acting mechanism with its associated levers, fulcrums, springs and the like may be of many different types, all of which may be modified as herein taught to produce the new result. For purposes of illustration and in no sense limiting my invention, I have chosen to illustrate a particular embodiment of a thermostat and snap acting mechanism equipped with my improvement.

The thermostat disclosed includes a tube 5 having a relatively large coefficient of expansion, inside which is a rod 6 having a relatively low coefficient of expansion. These thermostatic elements engage at the point 7 so that upon cooling of the tube 5 the rod 6 is moved toward the left in Figs. 1 and 2 into a housing 8 which is provided with a gas inlet and outlet 10 and 11, flow between which is controlled by the valve 12. Snap acting lever mechanism is provided between the inner end of rod 6 and the nose of valve 12. This comprises a frame 13 on which an adjusting lever 14 is fulcrumed at 14a. This fulcrum is best seen in Fig. 4. An adjusting screw 15 engages lever 14 and extends to the front of the apparatus where it is controlled by an adjusting knob 16. Fulcrumed at 17a on lever 14 is the main or thermostatic lever 17 which is directly engaged by the rod 6 at the point 17b. Fulcrumed in the lower end of frame 13 at 18a is the snap lever 18. This lever has a nose which engages the valve 12. A spring 19 is connected between the point 19a on lever 18 and point 19b on lever 17. Oscillation of lever 17 in response to movement of the thermostat carries the point 19b to one side or the other of the fulcrum point 18a of the snap lever. Obviously in the absence of other influences the spring 19 will cause movement of snap lever 18 either to the left or right as viewed in Figs. 1, 2 and 4 depending upon whether the point 19b is to the left or right respectively of the fulcrum point 18a.

Figure 4:
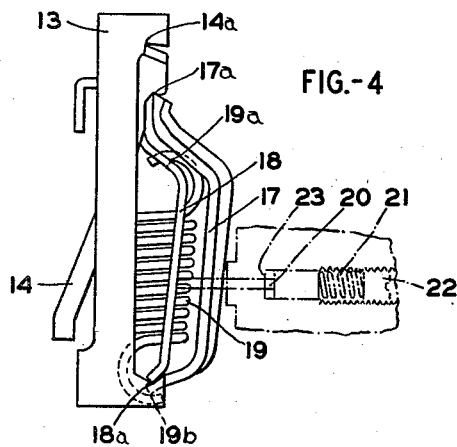

To illustrate the new principle involved, I have shown in Fig. 4 in full lines the position of the parts at the intermediate position of balance when the line of effective force of the spring 19 between the points 19a and 19b passes directly through the fulcrum point 18a of the snap lever 18, it being assumed that the thermostat rod 6 is moving the main lever 17 in a clockwise direction about its fulcrum and carrying the point 19b from right to left in Fig. 4, the ultimate result of which will be to cause movement of snap lever 18 in a counterclockwise direction about its pivot so as to open valve 12. Obviously with the parts in the full line position of Fig. 4, snap movement of lever 18 has not yet occurred and will not occur until further movement of the thermostatically controlled rod 6 carries point 19b farther toward the left. If now we assume that the spring-pressed plunger 20, shown in dash-dot lines, is in engagement with lever 18 and the plunger is urged toward the left by the spring 21, then the force of spring 21 will overcome the balanced forces and lever 18 will snap over center in a counterclockwise direction without further movement of the thermostatic rod 6.

This construction of Fig. 4 is incorporated in Fig. 2 where the plunger 20 has been inserted through a wall of the housing 8 backed up by the spring 21, tension of which is adjustable by means of the screw 22. In order not to interfere with the return movement of snap lever 18 toward the right, the abutment 23 is provided limiting the movement of plunger 20 toward the left so that as viewed in Fig. 2 there is a space between the left end of plunger 20 and the lever 18.

A construction similar to that shown at 20 and 21 might be provided on the left side of lever 18 to move the snap lever 18 toward the right in a direction to permit valve 12 to close when the parts are moving in the opposite direction. Instead of using a separate plunger and spring I have chosen to utilize the valve 12 as the plunger and the spring 24 for a double purpose. Normally a spring is provided at this point simply to insure that valve 12 closes when the nose of snap lever 18 moves away from it. In such a case no adjustment of the tension of spring 24 is necessary or is usually provided. In the present instance, however, to obtain the adjustment of thermostat sensitivity which I desire, I have provided means for adjusting the tension of spring 24. This comprises a screw 25 threaded in the cap 26 and accessible through an opening 27 at the center of the cap for insertion of a screw driver. Preferably the opening 27 is closed by a screw as indicated in Figs. 1 and 2 so as to prevent gas leakage and tampering with screw 25 after it has been set at the factory.

The parts of the snap acting mechanism will vary somewhat due to inaccuracies in manufacturing and assembling so that the sensitivity of the different mechanisms turned out in quantity will vary considerably. All of these mechanisms may be adjusted to a uniform sensitivity by means of the adjusting screw 25 illustrated in Fig. 1. This affects the snap-over movement only at one end of the range, namely at that end which requires valve 12 to close but by properly adjusting the tension of spring 24 the snap lever 18 may be moved over center to permit valve 12 to close several degrees sooner than would ordinarily be possible with a nonadjustable spring at the point 24 and the usual snap spring 19.

It will be noted in Fig. 1 that with valve 12 closed there is a space between the valve and the nose of lever 18 so that spring 24 does not oppose the first movement of lever 18 toward the left. This is analogous to the space already referred to in connection with Fig. 2 between the end of plunger 20 and lever 18. The reason for this is obvious. If springs 21 and 24 are opposing each other at any given time, obviously the effect of one is balanced against the other and they are not able to accomplish the purpose desired.

While I have described in connection with Fig. 4 that the effect of plunger 20 and spring 21 is to push the snap mechanism over center when it reaches a point which would otherwise be one of balance, a more scientific statement would be that the net effect of springs 21 and 19 is to cause a true point of balance to be reached slightly before the point 19b is carried into the position of alinement illustrated in Fig. 4 so that when the point 19b reaches the position illustrated in Fig. 4 (or even slightly before that point) the lever 18 will actually snap over moving toward the left.

It will now be understood that by the use of the adjustable spring 24 I control the sensitivity of the thermostatic mechanism at one end of its range of action, namely, the valve closing portion of the cycle of movement. With the parts indicated at 20 and 21 I am able to control the sensitivity of the thermostatic mechanism at the other end of its range or that which controls the valve opening portion of the cycle of movement.

No explanation is necessary with regard to control of the range or mean temperature established by the thermostatic mechanism as this is controlled by means of the screw 16 and the position of adjusting lever 14 as more fully disclosed in the copending application of Joseph A. Cerny, Serial No. 174,306, filed November 13, 1937.

What I claim is:

1. Snap acting mechanism of the character described, adapted for actuation by a thermostatic element, comprising a snap lever, a spring connected with said lever and adapted in either of two positions on either side of its fulcrum to exert turning force upon it, said spring in an intermediate position of balance exerting no turning force on said lever, a main lever adapted for operation by a thermostatic element and having an operative connection for causing relative movement of said spring back and forth across the snap lever fulcrum, and a supplemental spring having operative connection with said snap lever when the latter is on one side only of said position of balance and adjustable to produce pressure strong enough to push said snap lever beyond said position when said first named spring is near its position of balance.

2. Snap acting mechanism of the character described, adapted for actuation by a thermostatic element, comprising a snap lever, a main lever oscillatable by thermostatic means, a spring connecting said snap lever to a point on said main lever and movable by oscillation of said main lever to either of two positions in which it exerts its force on opposite sides of the snap lever fulcrum, said snap lever having an intermediate position of balance where said spring exerts no turning force upon said snap lever, and two supplemental springs having operative connection with said snap lever one on one side and the other on the other side only of said position of balance, said supplemental springs being adapted to move said snap lever in opposite directions and each having sufficient strength to push said snap lever beyond said position of balance with less movement of said thermostatic means than is required when using said first named spring alone.

3. Snap acting mechanism of the character described, adapted for actuation by a thermostatic element, comprising a snap lever, a main lever oscillatable by thermostatic means, a spring connecting said snap lever to a point on said main lever and movable by oscillation of said main lever to either of two positions in which it exerts its force on opposite sides of the snap lever fulcrum, said snap lever having an intermediate position of balance where said spring exerts no turning force upon said snap lever, two supplemental springs having operative connection with said snap lever one on one side and the other on the other side only of said position of balance, said supplemental springs being adapted to move said snap lever in opposite directions and each having sufficient strength to push said snap lever beyond said position of balance with less movement of said thermostatic means than is required when using said first named spring alone, and means for individually adjusting the tension of each of said supplemental springs, whereby to secure variable sensitivity of said snap acting mechanism when operated in either direction.

CARLTON W. BONDURANT.